(12) United States Patent
Felder et al.

(10) Patent No.: US 9,616,715 B2
(45) Date of Patent: Apr. 11, 2017

(54) TREAD FOR TIRE OF A DRIVE AXLE OF A HEAVY GOODS VEHICLE AND TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Thomas Felder, Clermont-Ferrand (FR); Fabien Marlier, Clermont-Ferrand (FR)

(73) Assignees: COMPAGNIE GENERALE DES ETABLISSEMENTS MICHELIN (FR); MICHELIN RECHERCHE ET TECHNIQUE, S.A. (CH)

( * ) Notice: Subject to any disclaimer, the term of this patent is extended or adjusted under 35 U.S.C. 154(b) by 261 days.

(21) Appl. No.: 14/415,260

(22) PCT Filed: Jul. 19, 2013

(86) PCT No.: PCT/EP2013/065326
§ 371 (c)(1),
(2) Date: Jan. 16, 2015

(87) PCT Pub. No.: WO2014/013065
PCT Pub. Date: Jan. 23, 2014

(65) Prior Publication Data
US 2015/0183274 A1  Jul. 2, 2015

(30) Foreign Application Priority Data

Jul. 20, 2012  (FR) ..................... 12 57067

(51) Int. Cl.
*B60C 11/00* (2006.01)
*B60C 11/03* (2006.01)
*B60C 11/12* (2006.01)

(52) U.S. Cl.
CPC ........ *B60C 11/032* (2013.04); *B60C 11/0306* (2013.04); *B60C 11/0311* (2013.04);
(Continued)

(58) Field of Classification Search
CPC ........................... B60C 11/032; B60C 11/033
(Continued)

(56) References Cited

U.S. PATENT DOCUMENTS 4,266,592 A  5/1981  Takigawa et al.

FOREIGN PATENT DOCUMENTS

| JP | 2002029218 | | 1/2002 |
| JP | 2006062469 A | * | 3/2006 |
| JP | 2006341770 | | 12/2006 |

OTHER PUBLICATIONS

International Search Report for PCT/EP213/065326 dated Nov. 9, 2013.

* cited by examiner

*Primary Examiner* — Timothy Kennedy
(74) *Attorney, Agent, or Firm* — Dickinson Wright PLLC

(57) ABSTRACT

Tread for a tire for the driven axle of a heavy goods vehicle, comprising a plurality of circumferential grooves delimiting at least three ribs each having a height and a width measured in the axial direction, axially delimited by two edge rows, each rib having a plurality of sipes able to close at least in part as they enter the contact patch, and opening onto each lateral face of the rib to form two edge corners and having a depth at least equal to 50% of the height of the rib, these sipes in pairs delimiting an elementary rib volume and an elementary contact surface, wherein each elementary volume delimited by two sipes of one and the same rib has a void volume opening on the contact face in the new state, having a total area on the tread surface at least equal to 0.4% and at most equal to 1.5% of the area of the elementary (Continued)

contact surface, having a depth at least equal to half the depth of the grooves, and determined such that it remains open as it passes through the contact patch so as to allow any liquid present on the road surface to be picked up.

11 Claims, 1 Drawing Sheet

(52) U.S. Cl.
CPC .......... *B60C 11/12* (2013.01); *B60C 11/1259* (2013.04); *B60C 2011/1254* (2013.04); *B60C 2200/06* (2013.04)

(58) Field of Classification Search
USPC .................................................. 152/209.15
See application file for complete search history.

TREAD FOR TIRE OF A DRIVE AXLE OF A HEAVY GOODS VEHICLE AND TIRE

This application is a 371 national phase entry of PCT/EP2013/065326, filed 19 Jul. 2013, which claims benefit of French Patent Application No. 1257067, filed 20 Jul. 2012, the entire contents of which is incorporated herein by reference for all purposes.

BACKGROUND

1. Field

The present disclosure relates to tire treads, notably treads for tires fitted to heavy goods vehicles. More specifically still, the treads are intended to equip tires intended for the driven axles of heavy goods vehicles.

2. Description of Related Art

A heavy goods vehicle comprises axles fitted with tires, and these axles are not all subjected to the same loads: in the case of a driven axle, the tires are subjected to driving forces and braking forces in addition to the payload carried, these forces being exerted between the road surface and the treads with which said tires are provided. These treads in the known way comprise a plurality of longitudinally and transversely oriented grooves, these grooves delimiting raised elements in the form of ribs and/or of blocks.

These grooves do not close up completely as they pass through the contact patch in which the tire is in contact with the road and therefore allow water to be removed from this contact patch, notably in rainy weather.

In order to ensure that tires on a driven axle produce good drive, it is known practice preferably to form treads comprising circumferential ribs at least in the central region, namely outside of the axially outermost parts of the treads. The axially outermost parts may be made up of blocks, it being possible for these blocks to be connected locally by bridges of material.

It is also known practice to add to the ribs a plurality of sipes the width of which is suited to these closing at least partially as they enter the contact patch, this closure giving the rib excellent rigidity in shear. By closing at least partially it is meant that the facing walls delimiting a sipe come at least partially into contact with one another in the contact patch. The sipes thus produced have a depth equal or close to the depth of the grooves so that they remain active over the entire service life of a tire (i.e. before the tire has to be changed because of wear or before the tire tread has to be renewed by a retreading operation).

Remember that the sipes have the advantage of generating additional edge corners of material that are of use in cutting into a film of liquid present on the road surface as this film may get between the tread and the road surface and cause a reduction in tire grip during running.

Of course, the number of sipes per rib needs to be determined carefully in order not to weaken the said rib. It is known practice, for a rib of given dimensions (height, width), to determine the number of sipes that can be made in order to enjoy substantially uniform operation.

With use, it has been found that under certain conditions in which there is a small depth of liquid film present on a smooth road surface, liquid can build up between the road surface and the material of which the tread is formed.

DEFINITIONS

The void ratio of a tread pattern is equal to the ratio between the surface area of the voids (essentially formed by grooves) delimited by the raised elements (blocks, ribs) and the total surface area (contact area of the raised elements and surface area of the voids). A low void ratio indicates that the tread has a large area for contact and a small area of voids between the raised elements.

A block is a raised element formed on a tread, this element being delimited by voids or grooves and comprising lateral walls and a contact face, the latter being intended to come into contact with the road surface during running.

A rib is a raised element formed on a tread, this element being delimited by two grooves. A rib comprises two lateral walls and a contact face, the latter being intended to come into contact with the road surface.

A radial direction is a direction perpendicular to the axis of rotation of the tire (this direction corresponds to the direction of the thickness of the tread).

An axial direction means a direction parallel to the axis of rotation of the tire.

A circumferential direction means a direction tangential to any circle centered on the axis of rotation. This direction is perpendicular both to the axial direction and to a radial direction.

A cut denotes either a groove or a sipe and corresponds to the space delimited by opposing walls of material distant from one another by a non-zero mean distance. What differentiates a sipe from a groove is precisely this distance; in the case of a sipe, this distance is suited to allowing opposing walls to come into contact as they enter the contact patch in which the tire is in contact with the road surface. For a sipe, this distance here is at most equal to 2 millimeters (2 mm). In the case of a groove, the walls of this groove cannot come into contact with one another, even partially, under normal running conditions.

The main direction of a sipe corresponds to the mean direction passing through the furthermost points of the sipe on the tread surface in the unworn new state.

The secondary direction is defined as the direction perpendicular to the main direction of a sipe and extending into the thickness of the tread.

The conditions of use of the tire as defined by the ETRTO standard specify the reference inflation pressure corresponding to the load-bearing capability of the tire as indicated by its load index and speed rating. These conditions of use can be referred to as the nominal conditions or normal conditions.

SUMMARY

There was a need to improve such treads in terms of grip on wet ground without impairing their performance under other conditions and notably without altering their performance in terms of wear.

To this end, one subject of the invention is a tread for a tire intended to be fitted to the driven axle of a heavy goods vehicle, this tread comprising a plurality of circumferential grooves each having a depth and a width, delimiting at least three ribs each having a height and a width measured in the axial direction, the tread being axially delimited by two edge rows, each rib being provided with a plurality of sipes able to close at least in part as they enter the contact patch in which the tire is in contact with a road surface, these sipes opening onto each lateral face of the rib to form two edge corners and having a depth at least equal to 50% of the height of the rib, these sipes in pairs delimiting an elementary rib volume and an elementary contact surface.

This tread is characterized in that on each elementary volume delimited by two sipes of one and the same rib there is formed a void volume opening on the contact face in the new state, this void volume having a total area on the tread surface at least equal to 0.4% and at most equal to 1.5% of the area of the elementary surface of this void volume, this void volume having a depth at least equal to half the depth of the grooves, and in that this additional void volume is determined such that it remains open as it passes through the contact patch so as to allow any liquid present on the road surface to be picked up. This liquid is ejected away from the contact region through the effect of centrifugal force. Furthermore, the void volume is located in the central part of the elementary volume, this central part of the elementary volume corresponding to a radial cylinder extending in this elementary volume and radially such as to be tangential to the sipes delimiting this elementary volume.

For preference, the minimum distance between two sipes delimiting an elementary volume is less than the axial width of the said elementary volume. In this way, the radial cylinder is wholly contained within the elementary volume.

For preference, the depth of the voids is greater than 0.75 times the depth of the grooves, and more preferably still, at least equal to the depth corresponding to the wear limit of the tread.

The advantage of the invention is that without adversely affecting the rigidity of each elementary volume, it creates a void volume available to pick up at least some of the liquid that may lie between the surface of the said volume and the road surface and preferably does so in the central part of each contact surface of the elementary volumes. Specifically, the sipes delimiting each elementary volume close up as they enter the contact patch and it is particularly beneficial to create voids in the central part that is furthest from the edges of the rib in which the said sipes are made.

Thanks to the provisions of embodiments of the invention, this tread also has the advantage of reduced sensitivity to attack from foreign bodies because the additional void volumes remain very limited.

According to one alternative form of the invention, the tread according to the invention is such that the void volume between two sipes of a same rib is formed by the volume of at least two cavities or wells, each cavity or well having a mean depth at least equal to 0.75 times the depth of the grooves (this groove depth corresponding to the height of the ribs).

For preference, each cavity has a cross section that is generally convex in shape and that meets an aspect-ratio condition $2/3 < I/L < 3/2$, where "I" is the maximum dimension of the cavity in the circumferential direction and "L" is the maximum dimension of the cavity in the transverse direction, so that each cavity remains open as it enters the contact patch.

A shape that is generally convex means that around the contour of each cavity, if a tangential circle of smaller surface area is drawn onto the tread surface, the difference in area between the surface area of this circle and that delimited by the contour of the cavity on the tread surface represents at most 30% of the surface area of the said circle.

This condition can be met notably with cross sections of circular, triangular or rectangular shape.

To facilitate the drainage of liquid towards the inside of the additional voids it is sensible to position the cavities so that they are equal or substantially equal distances from each of the sipes delimiting an elementary volume and distant from one another by a distance equal or close to the width of the rib divided by one more than the number of cavities.

In an advantageous alternative form of the invention, the tread comprises a central rib and, on each side, at least one intermediate rib, each intermediate rib being provided with sipes making a mean angle other than zero with the axial direction, the angles of the sipes of the intermediate ribs being such that the elementary elements make a V-shape on the tread.

It is possible to combine with the latter alternative form the configuration whereby the sipes formed on the central rib have an arrowhead shape to follow the inclination of the sipes formed on the ribs situated on each side of the central rib.

Another advantageous alternative form of the invention is to provide each edge row with a plurality of blocks spaced circumferentially apart by transversely or substantially transversely oriented grooves.

In order to further limit the reduction in rigidity caused by the presence of transverse grooves on the edges, it is preferable for the blocks at the edges to be joined together by a series of bridges of material.

Preferably, the alternative forms of tread according to the invention are such that the spacing of the sipes formed on the ribs is constant or substantially constant and chosen to be at least equal to 18 mm and at most equal to 52 mm. This choice is determined according to the depth of the grooves that delimit the rib in question; the greater the depth the greater the spacing of the sipes.

Other features and advantages of the invention will emerge from the description given hereinafter with reference to the attached drawing which shows one nonlimiting example of one alternative form of embodiment of the subject-matter of the invention.

DETAILED DESCRIPTION OF SPECIFIC EMBODIMENTS

For the figures that accompany this description, the same reference signs may be used to describe alternative forms of the invention provided that these reference signs refer to elements of the same nature, whether this be a structural or indeed a functional nature.

Figure 1:
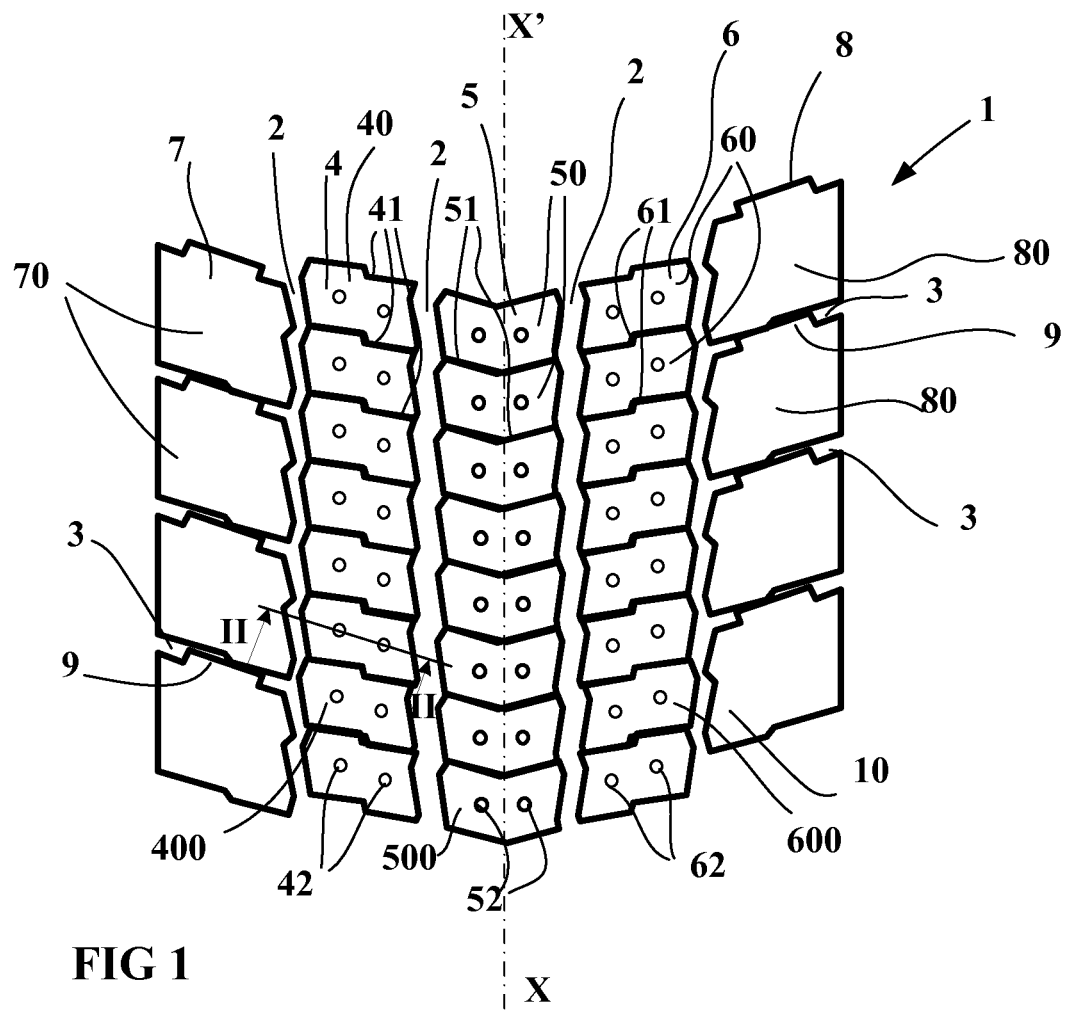
FIG. 1 shows a view of part of the tread surface of a tread according to an embodiment of the invention.

FIG. 1 shows part of a tread 1 for a heavy goods vehicle tire. This tire, of size 315/70R 22.5 is intended to be fitted to a driven axle of a heavy-duty heavy goods vehicle for motorway driving. This tread has a width equal to 282 mm.

Four grooves 2 of circumferential overall orientation and a zigzag geometry can be seen on this tread 1. These four grooves 2 have the same depth equal to 15 mm and a mean width of 10 mm. These grooves 2 delimit ribs: two intermediate ribs 4, 6 having a width equal to 45 mm, and one central rib 5 having a width equal to 47 mm. Furthermore, the tread 1 is axially delimited by two edge rows 7, 8 each one formed of a plurality of blocks 70, 80 respectively, these blocks being separated from one another in the circumferential direction by oblique grooves 3 making an angle equal or close to 71° with the circumferential direction (identified on the drawing as the direction XX'). The blocks 70, 80 of the edge rows 7, 8 are joined together by a local protrusion 9 which prevents the grooves 3 from closing up in the contact patch in which the tire is in contact with the road surface, so as to allow sufficient lateral removal of water when running in rainy weather.

A plurality of sipes 51 of a width less than 1 mm can be seen on the central rib 5, this width being chosen to allow the said sipes to close up almost completely when they enter the contact patch in which the tire is in contact with the road surface. By close up almost completely it must be understood that the opposing walls delimiting each sipe are at least partially in contact with one another, which allows the central rib 5 to maintain good rigidity, at least in that part of the rib that is in the contact patch and in contact with the road surface.

The sipes of the central rib have, on the tread surface, a V-shaped geometry and are arranged with a mean spacing of 29 mm.

Each pair of successive sipes delimits an elementary volume 50 having a contact surface 500 that forms part of the tread surface of the tread.

Two cavities 52 are formed in each elementary volume 50, the cavities in this particular instance having a circular cross section of diameter 2.5 mm and depth 12.5 mm. These two cavities 52 constitute a void volume equal to 120 mm$^3$ capable, as they enter the contact patch, of picking up a volume of liquid that may lie between the contact surface of the elementary volume 50 and the road surface. The cavities 52 described here are directed radially, which means to say that their main direction intersects the axis of rotation of the tire, although of course they could be arranged so that they make a non-zero angle with the radial direction. In this particular instance, the two cavities 52 formed on the central rib 5 are aligned with the axial (transverse) direction. A central part 100 is defined on each elementary volume 50 and the outline of this central part on the contact face 500 is circular and tangential to the sipes delimiting this elementary volume. This circle has a diameter equal to 29 mm and is therefore wholly contained in the elementary volume. This central part extends radially toward the inside of the tread. The cavities 52 are situated inside this central part 100 of the elementary volume so as to improve the drainage performance of this part of the elementary volume.

Visible on each intermediate rib 4 or 6 are sipes 41, 61, respectively, which at the same angle extend the branches of the V-shaped sipes 51 of the central rib 5. This configuration leads to a tread that has a preferred direction of running. Advantageously, the tire may bear a visual means indicating this preferred direction.

On these intermediate ribs 4, 6 the spacing of the sipes 41, 61 is the same as was used on the central rib 5. These sipes (41, 61) open onto each lateral face of the ribs to form edge corners and in pairs delimit an elementary rib volume (40, 60) and an elementary contact surface (400, 600). After the manner of that which is formed on the central rib, the cavities 42, 62 are situated inside the central part of the elementary volumes in order to improve the drainage performance of this part of the elementary volume.

The depths of the sipes of the intermediate ribs are equal to 12.5 mm; the widths of the sipes of these intermediate ribs are equal to 0.4 mm. These sipes delimit elementary volumes 41 and 60 respectively, of which the surfaces for contact with the road surface (400, 600) are holed by two cavities 42, 62, respectively. These cavities 42, 62 have dimensions similar to those of the cavities 52 of the central rib 5 except that the cavities of one and the same elementary volume on an intermediate rib are oriented in a direction substantially parallel to the mean inclination of the sipes delimiting this elementary volume.

On the intermediate ribs 4, 6, the mean distance between two sipes is equal to 29 mm; the cavities are positioned mid-way between the sipes, namely at 14 mm.

Figure 2:
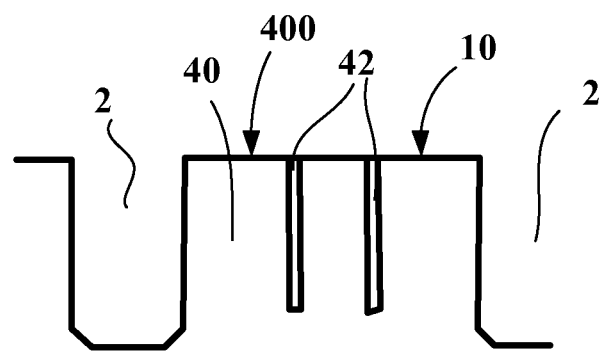
FIG. 2 shows a view in cross section on II-II of FIG. 1.

FIG. 2 is a cross section in a plane of section that intersects the plane of FIG. 1 along the line embodied as II-II.

This FIG. 2 shows the intermediate rib 4 in a plane of section passing through the axis of rotation of the tire. This rib is provided with a plurality of sipes cutting the rib into elementary volumes 40 contained between two sipes. Cavities of constant cross section and of a depth slightly less than the depth of the grooves 2 may be seen. Of course, these cavities could adopt any shape notably shapes that widen with depth or alternatively may be of constant cross section ending in a widened portion constituting an additional liquid-storage volume. The limits of the cylindrically shaped central part 100 inside which the cavities are formed can also be seen.

In order to derive greatest benefit of the effect of collecting liquid on the contact face of an elementary volume, it is sensible for the cavities not to be too close together, but distributed uniformly.

As the invention has been described in general terms, it must be appreciated that this invention is not restricted to this alternative form alone. It is clear that various modifications can be made thereto without departing from the overall scope of the present invention.

In all the instances set out, a person skilled in the art can adapt the shape of each well or cavity forming a void that does not close up in the contact patch. For preference, each well has a shape of circular or triangular or rectangular cross section. Whatever the chosen shape, it is preferable to meet a condition concerning the aspect ratio between the width of the cavity in the longitudinal direction and the length of the cavity in the transverse direction such that this ratio is comprised between 2/3 and 3/2.

The invention claimed is:

1. A tread for a tire adapted to be fitted to the driven axle of a heavy goods vehicle, this tread comprising:
    a plurality of circumferential grooves each having a depth and a width,
    at least three ribs delimited by the circumferential grooves, each having two lateral faces, a height measured in the radial direction and a width measured in the axial direction,
    two edge rows axially delimiting the tread,
    wherein each rib is provided with a plurality of sipes able to close at least in part as they enter a contact patch in which the tire is in contact with a road surface,
    herein these sipes open onto each lateral face of the rib to form two edge corners and have a depth at least equal to 50% of the height of the rib,
    wherein these sipes in pairs delimiting an elementary rib volume and an elementary contact surface,
    wherein, on each elementary volume delimited by two sipes of one and the same rib there is formed a void volume opening on the contact face in the new state,
    wherein this void volume has a total area on the tread surface at least equal to 0.4% and at most equal to 1.5% of the area of the elementary contact surface,
    wherein this void volume has a depth at least equal to half the depth of the grooves,
    wherein this void volume is determined such that it remains open as it passes through the contact patch so as to allow any liquid present on the road surface to be picked up,
    wherein this void volume is located in to a central part of the elementary volume, wherein this central part corresponds to a radial cylinder formed in the elementary volume and tangential to the sipes delimiting this elementary volume.

2. The tread according to claim 1, wherein the void volume between two sipes of a rib is formed by the volume of at least two cavities, each cavity having a mean depth at least equal to 0.75 times the depth of the grooves.

3. The tread according to claim 2, wherein each cavity has a cross-sectional shape that meets an aspect-ratio condition $2/3 < I/L < 3/2$, where "I" is the maximum dimension of the cavity in the circumferential direction and "L" is the maximum dimension of the cavity in the transverse direction.

4. The tread according to claim 2, wherein the cavities are arranged in such a way as to be equal or substantially equal distances from each of the sipes delimiting an elementary volume and distant from one another by a distance equal or close to the width of the rib divided by one more than the number of cavities.

5. The tread according to claim 1, wherein it comprises a central rib and, on each side, at least one intermediate rib, wherein each intermediate rib is provided with sipes making a mean angle other than zero with the axial direction, wherein the angles of the sipes of the intermediate ribs are such that the elementary volumes make a V-shape on the tread.

6. The tread according to claim 5, wherein the sipes formed on the central rib have an arrowhead shape to follow the inclination of the sipes formed on the ribs situated on each side of the central rib.

7. The tread according to claim 1, wherein each edge row is provided with a plurality of blocks spaced circumferentially apart by transversely or substantially transversely oriented grooves.

8. The tread according to claim 7, wherein the blocks of the edge rows are connected at least in part by a series of protrusions of rubber formed in the grooves.

9. The tread according to claim 1, wherein the spacing of the sipes formed on the ribs is constant or substantially constant and chosen to be at least equal to 18 mm and at most equal to 52 mm, this choice being determined according to the depth of the grooves that delimit the rib in question.

10. The tread according to claim 1, wherein the minimum distance between two sipes delimiting an elementary volume is less than the axial width of the elementary volume.

11. A tire to be fitted to the driven axle of a heavy goods vehicle, this tire comprising a tread according to claim 1.

* * * * *